United States Patent
Norman et al.

(10) Patent No.: US 7,931,129 B2
(45) Date of Patent: Apr. 26, 2011

(54) RAPID TAKE UP AND VIBRATION PROOF ADJUSTER MECHANISM

(75) Inventors: Mark Anthony Norman, Mid-Clamorgan (GB); Martin Taylor, Gwent (GB)

(73) Assignee: ArvinMeritor Technology, LLC, Troy, MI (US)

( * ) Notice: Subject to any disclaimer, the term of this patent is extended or adjusted under 35 U.S.C. 154(b) by 1320 days.

(21) Appl. No.: 11/199,003

(22) Filed: Aug. 8, 2005

(65) Prior Publication Data

US 2005/0269171 A1    Dec. 8, 2005

Related U.S. Application Data

(63) Continuation-in-part of application No. 10/355,511, filed on Jan. 31, 2003, now Pat. No. 6,955,246.

(51) Int. Cl.
*F16D 55/02* (2006.01)

(52) U.S. Cl. 188/71.9; 188/72.8; 188/265; 188/196 BA; 188/196 F

(58) Field of Classification Search .............. 188/71.9, 188/72.8, 265, 196 R, 196 F, 196 B, 196 BA, 188/196 V
See application file for complete search history.

(56) References Cited

U.S. PATENT DOCUMENTS

| | | | | |
|---|---|---|---|---|
| 5,201,387 A | * | 4/1993 | Taig | 188/72.8 |
| 5,568,845 A | | 10/1996 | Baumgartner et al. | |
| 5,722,516 A | * | 3/1998 | Forni et al. | 188/71.9 |
| 5,819,884 A | * | 10/1998 | Giering | 188/71.9 |
| 6,349,801 B1 | * | 2/2002 | Koth et al. | 188/72.8 |
| 6,405,836 B1 | * | 6/2002 | Rieth et al. | 188/72.1 |
| 6,705,435 B2 | * | 3/2004 | Severinsson | 188/72.8 |
| 6,752,249 B1 | * | 6/2004 | Jungbecker et al. | 188/162 |
| 6,837,342 B1 | * | 1/2005 | Olschewski et al. | 188/72.8 |

FOREIGN PATENT DOCUMENTS

| | | | |
|---|---|---|---|
| DE | 199 45 5433 | * | 3/2001 |
| EP | 0648952 | | 4/1995 |
| WO | 2004070226 | | 8/2004 |

OTHER PUBLICATIONS

Search Report EP06253494.

* cited by examiner

*Primary Examiner* — Bradley T King
(74) *Attorney, Agent, or Firm* — Carlson, Gsakey & Olds

(57) ABSTRACT

A slack adjustment system for a disk brake includes a biasing member to adjust slack in a brake system. The biasing member operates independently of pressure applied to a brake actuator. A locking member prevents adjustment when adjustment is not necessary. Release of the locking member allows the biasing member to adjust a resting position of brake pads independent of driver applied brake pressure.

20 Claims, 14 Drawing Sheets ately adjusting slack independent of the pressure applied to the brake system. In addition, a locking device prevents undesirable adjustment of slack in the brake system.

RAPID TAKE UP AND VIBRATION PROOF ADJUSTER MECHANISM

BACKGROUND OF THE INVENTION

This application is a continuation in part of U.S. application Ser. No. 10/355,511, filed on Jan. 31, 2003 now U.S. Pat. No. 6,955,246.

The present invention relates to an adjuster mechanism for a brake.

As brake pads or a brake disc wear a gap between the brake pads and brake disc increases. Due to the increase in the gap between the brake pads and the brake disc a brake actuator must travel farther to engage the brake. In other words, there is more slack when the brake is applied, which causes the brakes to become less effective. In order to compensate for slack, a slack adjustment mechanism moves the brake pads closer to the brake disc prior to brake engagement. This adjustment assures a consistent amount of actuator travel in spite of brake pad wear.

Conventional brake adjuster mechanisms use relatively complex mechanical assemblies to perform this function. Force from the brake actuator is commonly utilized to drive the adjuster mechanism, which may reduce brake effectiveness and efficiency.

In addition, the adjuster mechanism may shift while the brake is not being applied. Shifting may cause undesirable brake pad wear, or further increase slack in the brake system, which may reduce the brake performance.

Accordingly, it is desirable to provide an adjuster mechanism which is not effective when the brake is not being utilized.

SUMMARY OF THE INVENTION

The slack adjustment system according to the present invention provides an adjustment mechanism which utilizes a biasing member to adjust slack in a braking system. The biasing member operates independently of the pressure applied by a brake actuator. A locking mechanism is utilized to secure the adjustment mechanism in place when adjustment is not desired. Additionally, the locking mechanism controls the desired amount of slack.

The locking mechanism selectively engages an adjustment gear, or any rotational member engaged with the gear, to prevent the gear from being rotated and undesirably adjusting the gap between the brake pad and the brake disc. The locking mechanism prevents adjustment when the brake is not applied. The locking mechanism includes a latch interfitting with the gear to prevent rotation when engaged with the gear. The latch disengages from the gear after a predetermined amount of movement of the latch. Release of the locking mechanism allows the gear to rotate. The biasing member is mounted to engage and rotate the gear when the locking member is not preventing movement. The biasing member is of a type which applies a rotational force independent of the amount of pressure applied by the brake actuator. The biasing member may be a spring, electric motor, air powered motor or the like.

The present invention therefore provides a method of automatically adjusting slack independent of the pressure applied to the brake system. In addition, a locking device prevents undesirable adjustment of slack in the brake system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
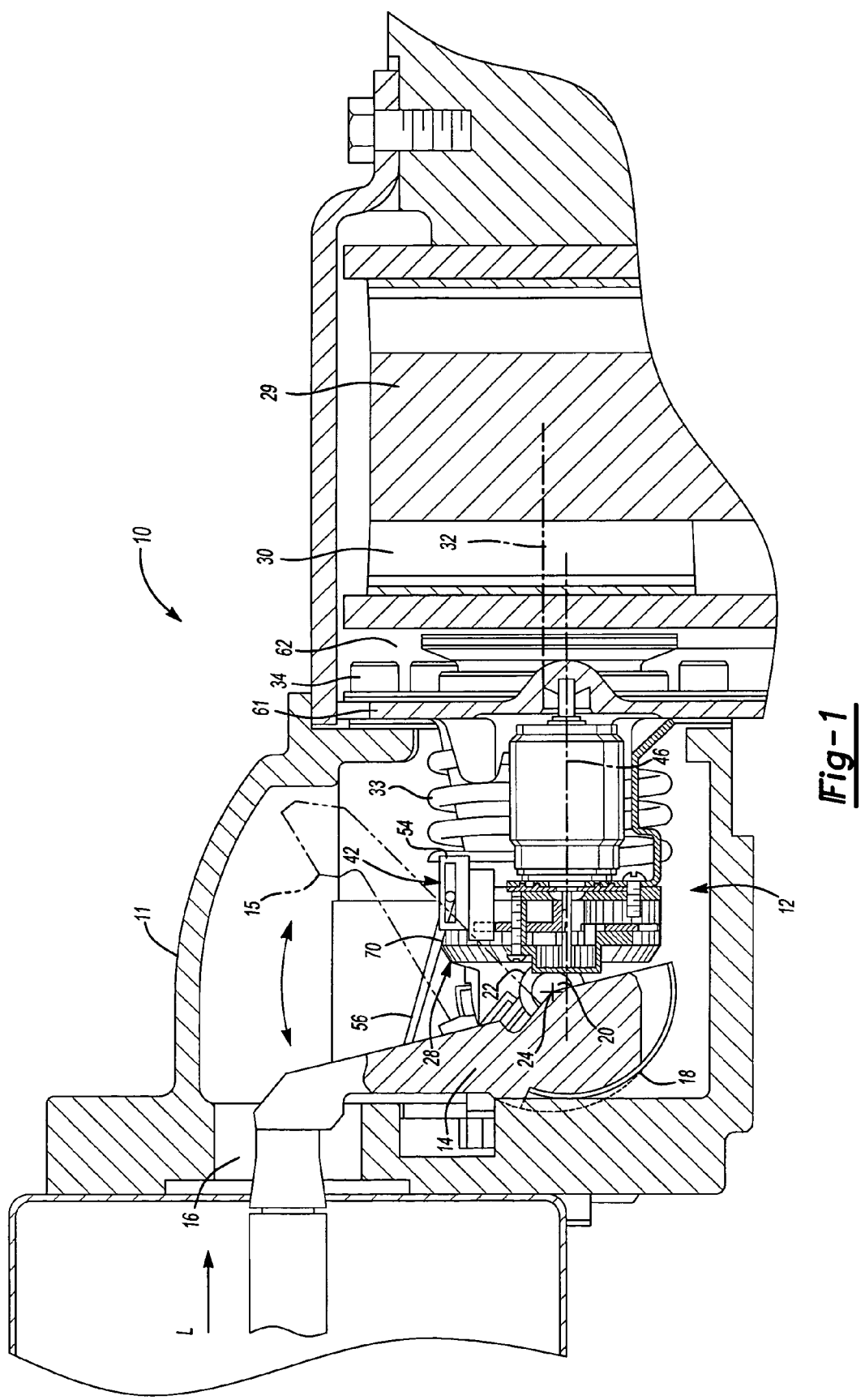
FIG. 1 is a sectional side-view of a brake assembly with one embodiment of a slack adjustment system according to the present invention.

FIG. 1 illustrates a disc brake assembly 10 that utilizes a slack adjustment system 12 of the present invention. The disc brake assembly 10 has a frame 11, which encloses the internal components and bears the loads generated by them. As a driver operates a brake (not shown) an input load (illustrated by arrow L) is transferred to a lever 14, through an opening 16 in the frame 11. The lever 14 is rotatably supported by the frame 11 through a bearing 18. Applying the input load L rotates the lever 14 about a lever axis 20. That is, the lever 14 rotates clockwise about the lever axis 20, as illustrated in FIG. 1.

A cylindrical roller 22 is recessed within the base of the lever 14. The roller 22 is eccentrically centered relative the center of rotation of the lever 14. That is, the roller 22 rotates about a roller axis 24 that is offset from the lever axis 20. When the input load L causes the lever 14 to rotate about the lever axis 20 the roller 22 rotates about the roller axis 24. Because the roller axis 24 is offset from the lever axis 20 the roller 22 moves in an arc relative to the lever axis 20 (the position 15 illustrated in phantom shows the extreme of travel available to the lever 14).

Figure 2A:
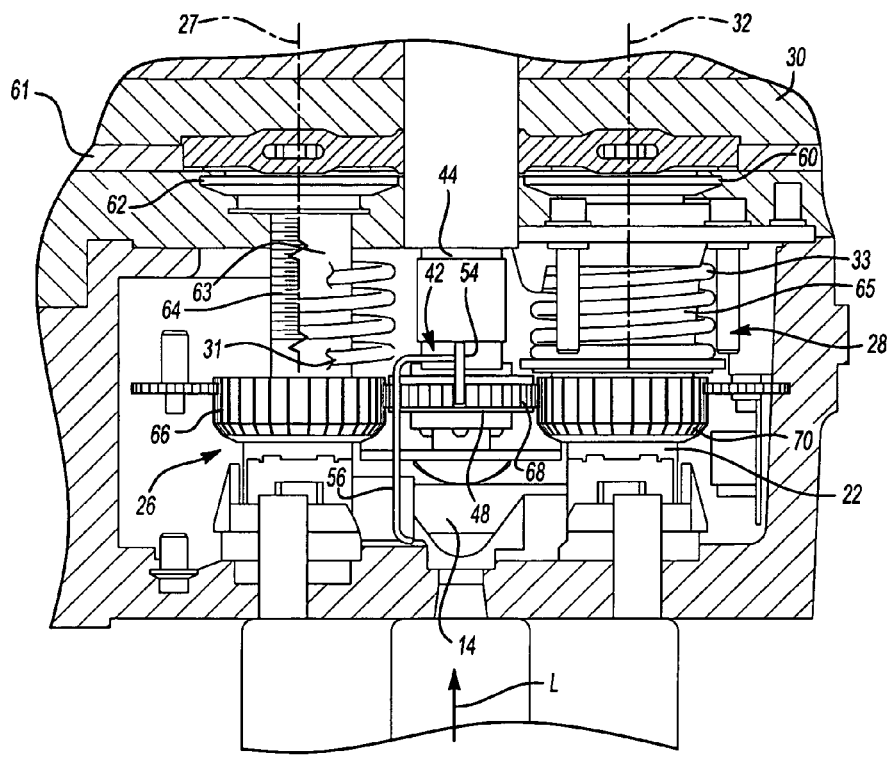
FIG. 2A is a sectional plan-view of a brake assembly.

FIG. 2A shows a first thrust assembly 26 and a second thrust assembly 28. The eccentric movement of the roller 22 engages the first thrust assembly 26 and the second thrust assembly 28 and applies a load causing the first and second thrust assemblies 26 and 28 to move perpendicularly away from the lever 14, guided by a housing 61 that is attached to frame 11 by fasteners 34, (only one shown in FIG. 1). This motion defines a first thrust axis 27 perpendicular to the lever axis 20 and roller axis 24 along which the first thrust assembly 26 moves. The axial movement of the first thrust assembly 26 along the first thrust axis 27 engages the brake pad 30 by way of a first thrust plate 62. Similarly, axial movement of the second thrust assembly 28 along a second thrust axis 32 engages the brake pad 30 by way of a second thrust plate 60. The brake pad 30 then engages the brake disc 29.

When the driver releases the brake, the input load L is reduced and a first return spring 31 and second return spring 33 drive the first and second thrust assemblies 26 and 28 to the original positions. The lever 14 and roller 22 also return to the original positions. The first and second return springs 31 and 33 restrain the first thrust assembly 26, second thrust assembly 28, roller 22 and lever 14 in the original positions when no input load L is being applied.

As a result of use, brake pad 30 wears away and a gap between the brake pad 30 and the brake disc 29 becomes greater over time. The first and second thrust assemblies 26 and 28 must then travel farther to cause the brake pad 30 to engage the brake disc 29. To eliminate the need for the brake pad 30 to travel further the first and second thrust assemblies 26 and 28 are lengthened to maintain a constant distance between the brake pad 30 and brake disc 29 over time. The first thrust assembly 26 consists of internally threaded first nut 63 and externally threaded first screw 64. The first nut 63 is rotationally constrained by the housing 61, such that when the first screw 64 is rotated, the length of the first thrust assembly 26 along the thrust axis 27 is altered. The second thrust assembly 28 has a similar screw and nut arrangement where the second thrust assembly 28 consists of internally threaded second nut 65 and an externally threaded second screw 67 (shown in FIG. 2B). The lengths of the first thrust assembly 26 and second thrust assembly 28 are synchronized by a rotational member 48, which is permanently engaged with the first and second screws 64 and 67 by way of a gear 68. If no constraint was in place the rotational member 48 might cause rotation of the first and second screws 64 and 67 lengthening the first and second thrust assemblies 26 and 28 until the brake pad 30 and brake disc 29 were touching.

Figure 2B:
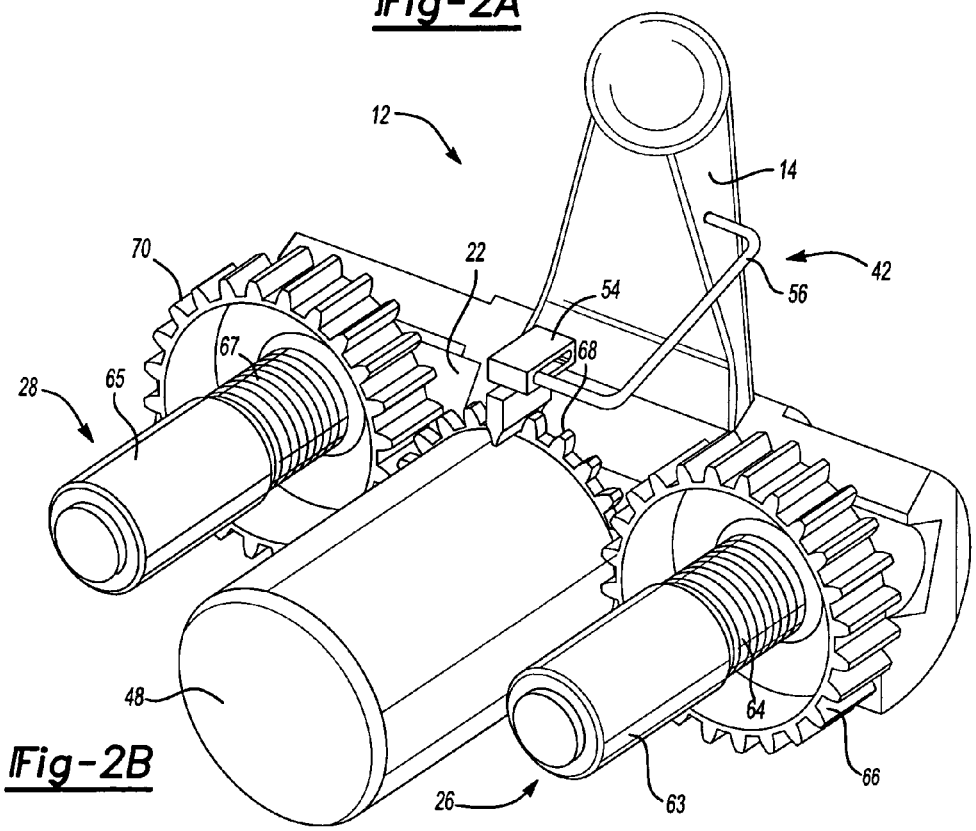
FIG. 2B is a perspective view of one embodiment of the slack adjustment system with the latch engaged on a rotational member.

FIG. 2B shows the slack adjustment system 12 with a locking mechanism 42 that selectively engages the gear 68 to prevent the first screw 64 and second screw 67 from being rotated and undesirably adjusting the gap between the brake pad 30 and the brake disc 29. The locking mechanism 42 includes a latch 54 mounted to a link 56, which may be a rod or the like, which is fixed to move with lever 14. The latch 54 may engage the gear 68 on rotational member 48 preventing rotation of the rotational member 48. The latch 54 engages the gear 68 when the brake is not applied, and when the brake is applied but the first thrust assembly 26 and second thrust assembly 28 have moved by less than the pre-defined slack such that no adjustment is required.

Figure 3:
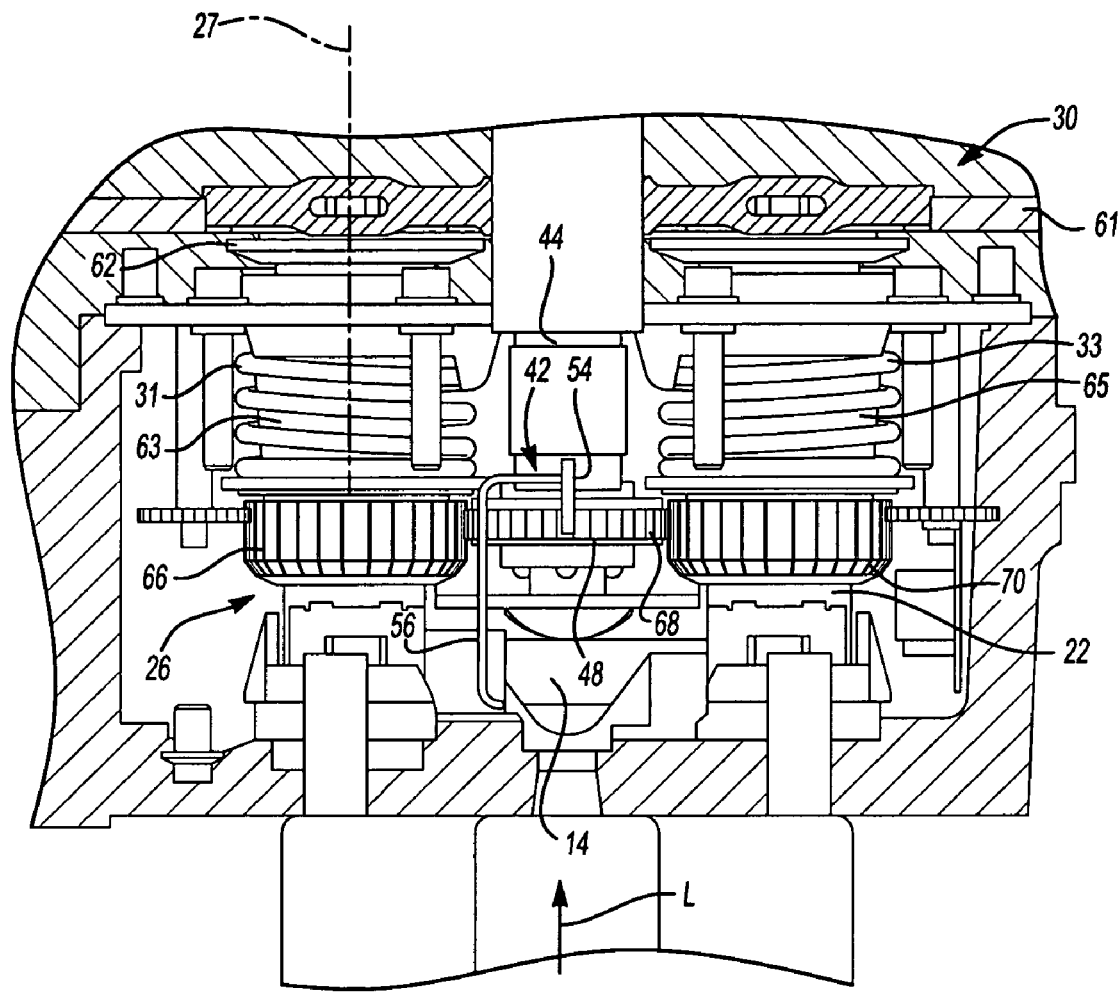
FIG. 3 is a sectional plan-view of the slack adjustment system according to the present invention showing a gear moved forward by a distance equal to the desired amount of slack, with the latch still engaged with the rotational member.

When the brake is not applied, or during normal braking movement, as shown in FIG. 3, the locking mechanism 42 is engaged and the rotational member 48 cannot rotate to lengthen the first thrust assembly 26 and second thrust assembly 28. The axial force applied to first screw 64 and second screw 67 by rotation of lever 14 axially drives the first thrust assembly 26 and second thrust assembly 28 along the first and second thrust axes 27 and 32 toward the brake disc 29. The locking mechanism 42 and latch 54 driven by the lever 14 via a link 56, move relative to the gear 68 on the outside of the rotational member 48 (shown in FIG. 3 to be moving along an axis parallel to the first thrust axis 27, but alternatively could be moved radially away from the first thrust axis 27 by re-arranging the connecting link 56). The link 56 may be rotatably connected to the lever 14 such that when lever 14 is driven forward link 56 rotates to maintain the relative position between latch 54 and gear 68 at an equivalent height.

Figure 4:
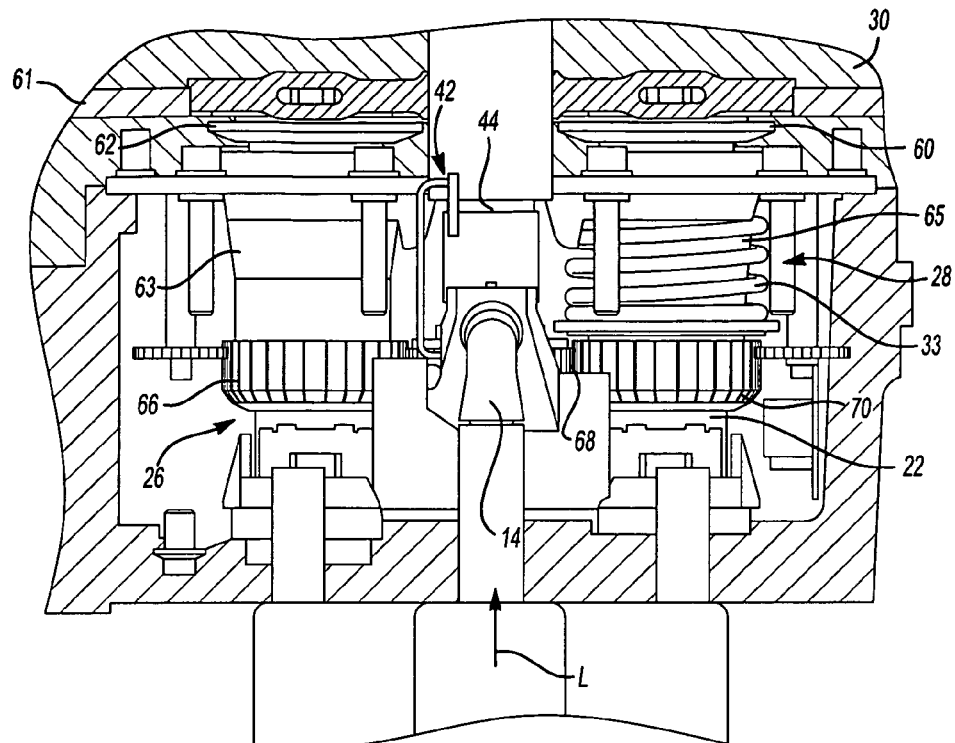
FIG. 4 is a sectional plan view of the slack adjustment system according to the present invention showing all components in the brake fully applied position.

The point at which the latch 54 disengages from the gear 68 is determined by the geometry of the link 56. The geometry is designed such that when a pre-defined slack between the brake pad 30 and disc 29 has been taken up, the latch 54 disengages from the gear 68. Simultaneously, load starts to be applied to the first thrust assembly 26 and second thrust assembly 28 via the brake pad 30 that engages the brake disc 29. This load produces a friction torque between the first nut 63 and first screw 64, and the second nut 65 and the second screw 67, preventing any relative rotation and, hence, adjustment when the brake is applied, shown in FIG. 4. When the brake is released, all components are returned to their original positions by the return springs 31 and 33. The latch 54 engages gear 68 again and no adjustment of the length of the first thrust assembly 26 and second thrust assembly 28 takes place.

As the brake pad 30 wears, the slack between the brake pad 30 and the brake disc 29 increases, and the first thrust assembly 26 and second thrust assembly 28 must move a greater distance along the thrust axis 27 in order to engage the brake pad 30 with the brake disc 29. To compensate for the wear on the brake pad 30, the first and second screws 64 and 67 are adjusted to increase the overall length of the thrust assembly 26, resulting in a constant distance being maintained between the brake pad 30 and brake disc 29.

Figure 5:
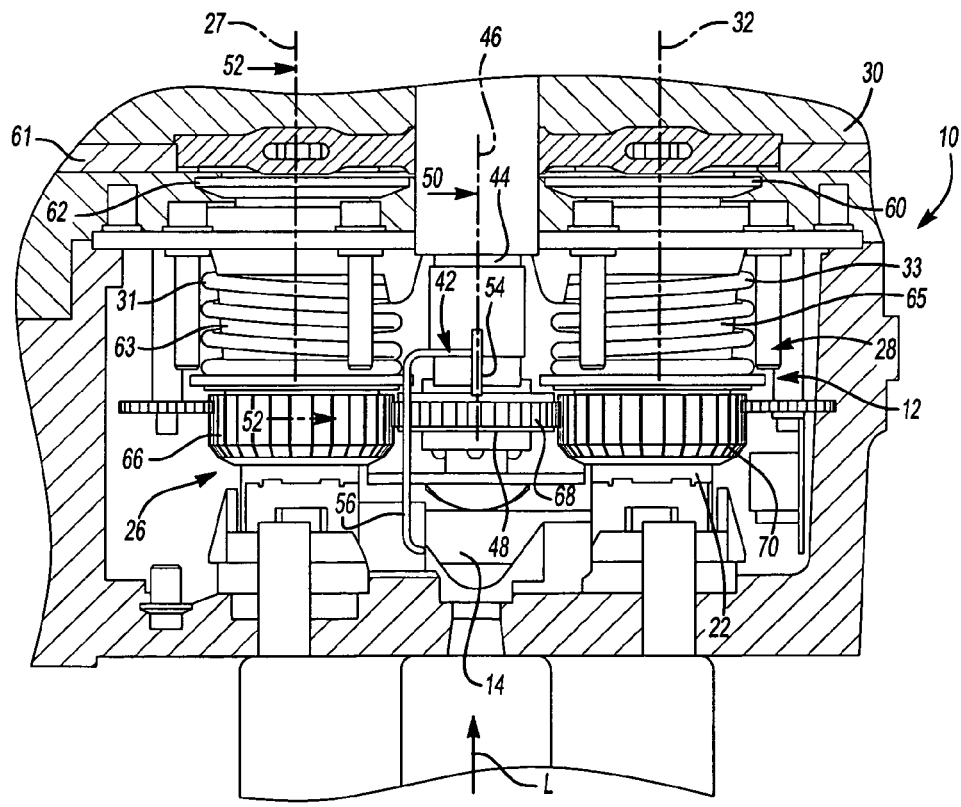
FIG. 5 is a sectional plan-view of the slack adjustment system according to the present invention shown in the disengaged position.
Figure 6:
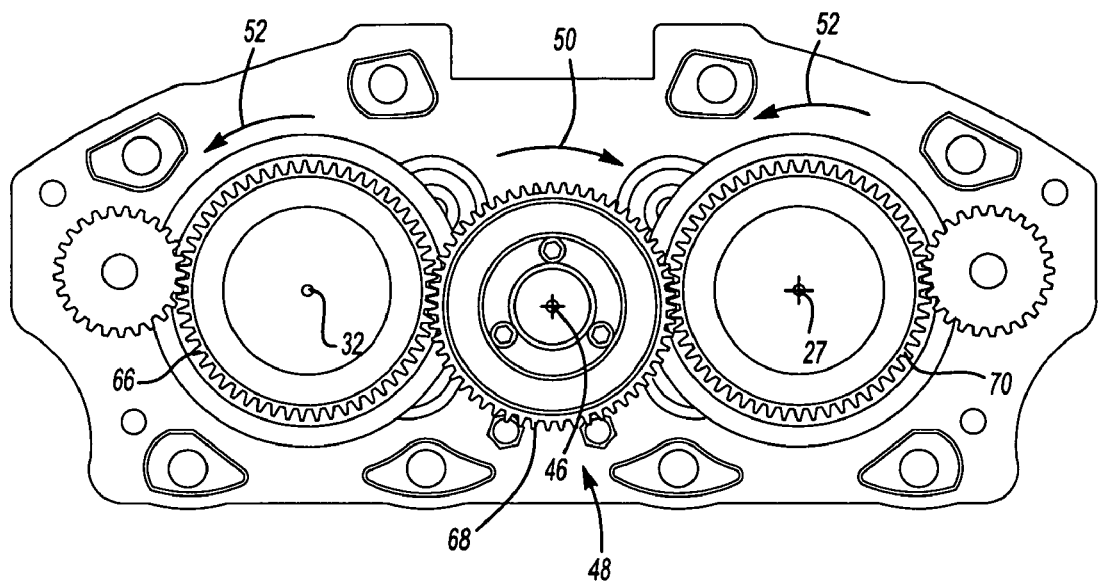
FIG. 6 is a sectional end-view of the rotational member and gear-train showing the preferred directions of rotation.

Referring to FIG. 5, the adjuster system 12 of the present invention is utilized to adjust the slack in the brake assembly 10. When the locking mechanism 42 is released, as shown, the rotational member 48 and first and second screws 64 and 67 can rotate. The rotational member 48 includes a biasing member 44 and the gear 68 mounted in the housing 61. The biasing member 44 causes the gear 68 to rotate about a biasing axis 46. The biasing axis 46 is preferably parallel to and offset from the first thrust axis 27, but could be in any position or angle inside or outside the frame 11 where the rotational member 48 can still be engaged directly or indirectly to the first and second screws 64 and 67. The biasing member 44 is preferably a coil spring but may take other forms such as an electric motor, air motor, or the like. The gear 68 is mounted about the biasing member 44 and is driven by the biasing member 44 in a first rotational direction 50 about the biasing axis 46. The gear 68 engages with the first and second screws 64 and 67 preferably by gear teeth, but other means of engagement may be used. The first and second screws 64 and 67 rotate about the thrust axes 27 and 32 in a second rotational direction 52. That is, rotational member 48 rotates in a clockwise direction, which rotates the first and second screws 64 and 67 in a counter-clockwise direction, as illustrated in FIG. 6. Rotation of the first and second screws 64 and 67 causes the first and second nuts 63 and 65 to move toward the brake pad 30, thereby lengthening the thrust assemblies 26 and 28, and decreasing the slack.

Figure 7A:
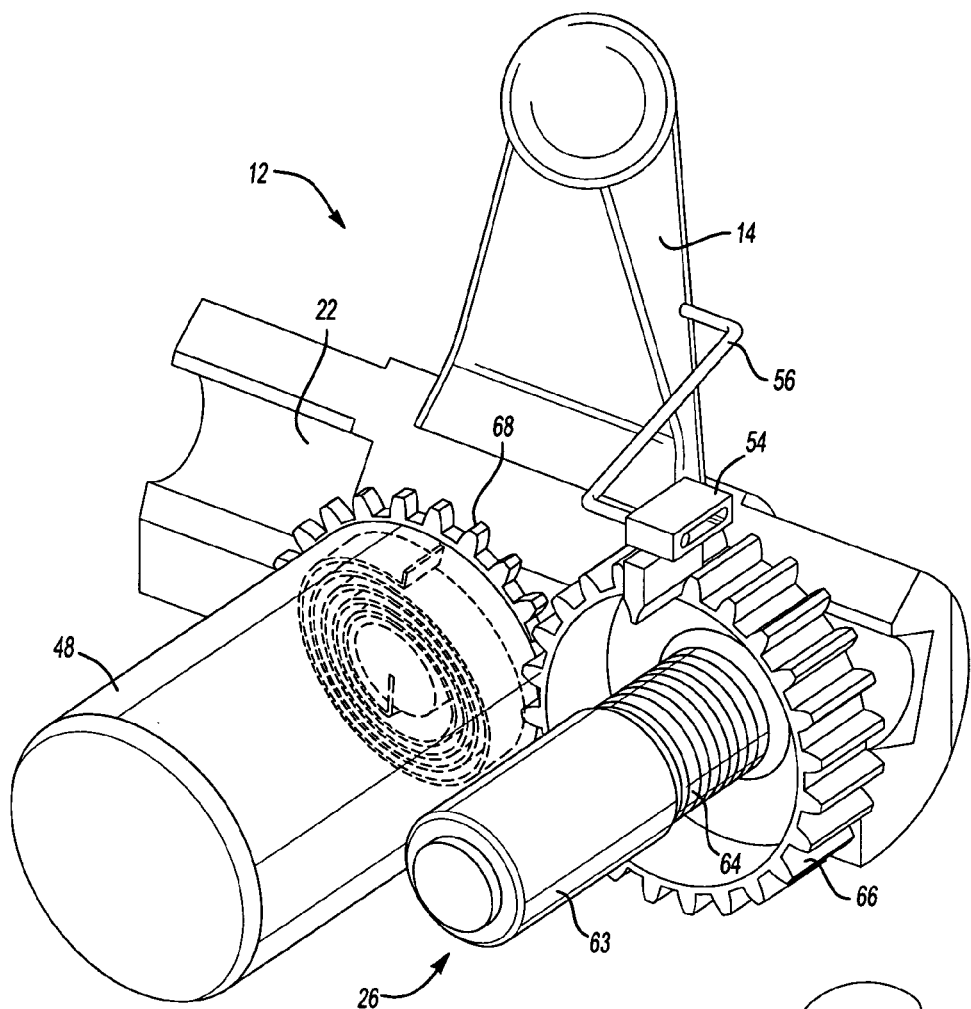
FIG. 7A is a perspective view of one embodiment of the slack adjustment system of the present invention in a non-braking position.
Figure 7B:
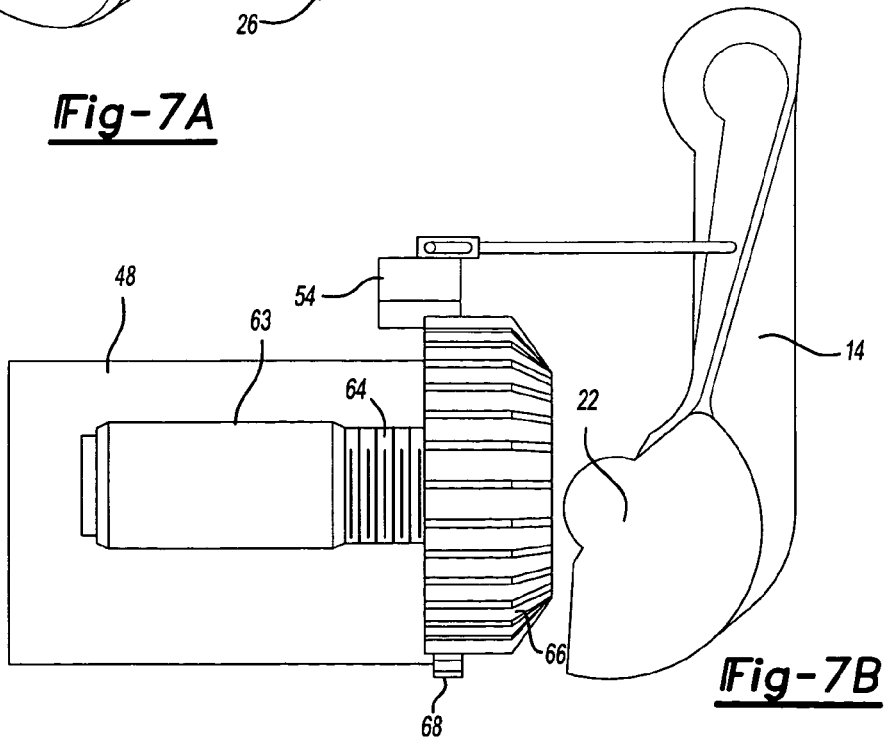
FIG. 7B is a side view of the FIG. 7A embodiment of the slack adjustment system of the present invention in a non-braking position.

FIGS. 7A and 7B show an alternate embodiment. The lever 14 is in a position when no load is being applied. Rotational member 48 is prevented from rotation by latch 54 that engages a first gear 66 on the first screw 64. First gear 66 meshes with the gear 68 on the rotation member 48. Latch 54 prevents rotation of first gear 66 and in turn prevents rotation of gear 68. A second gear meshes with gear 68, as shown in FIG. 1, in a similar manner as the first gear 66. The second gear 70 is prevented from rotation by gear 68 that also acts to synchronize the first gear 66 with the second gear 70 ensuring that the first thrust assembly 26 and second thrust assembly 28 are adjusted the same length.

Figure 8A:
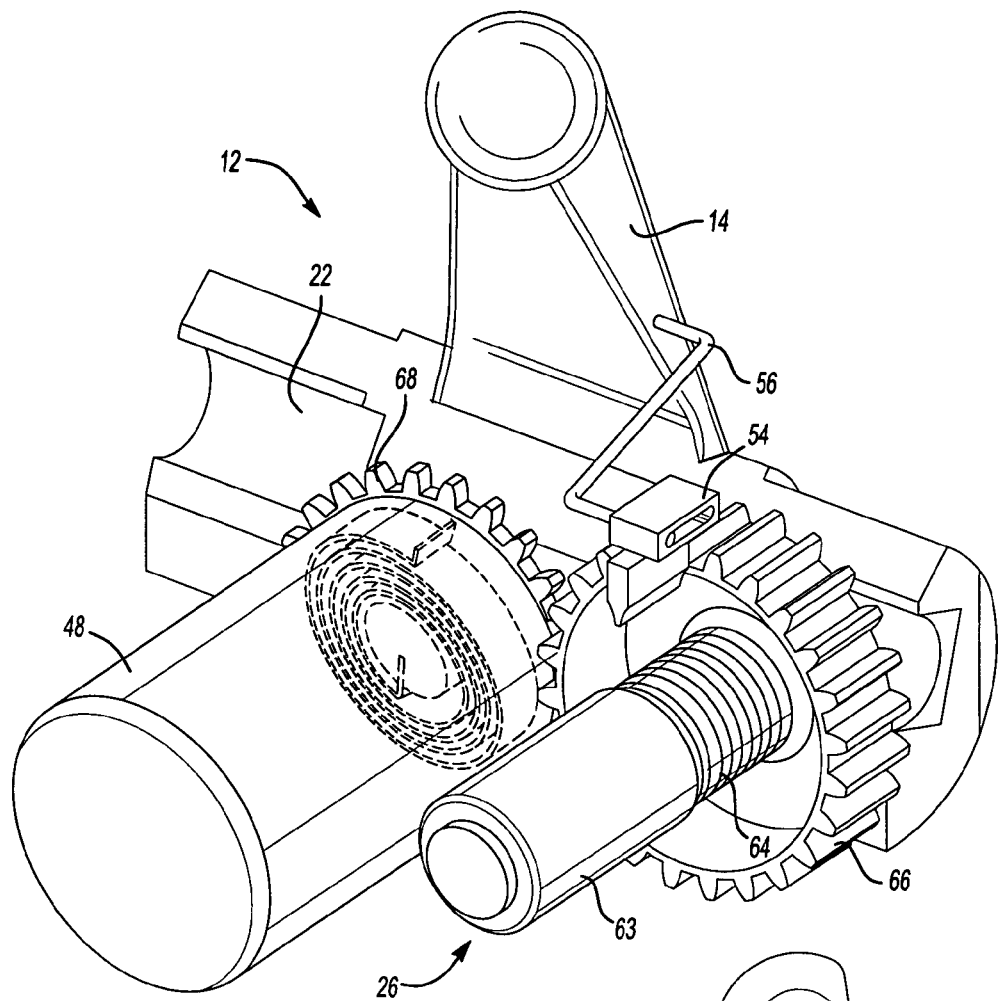
FIG. 8A is a perspective view of the FIG. 7A embodiment of the slack adjustment system of the present invention in a partial braking position.
Figure 8B:
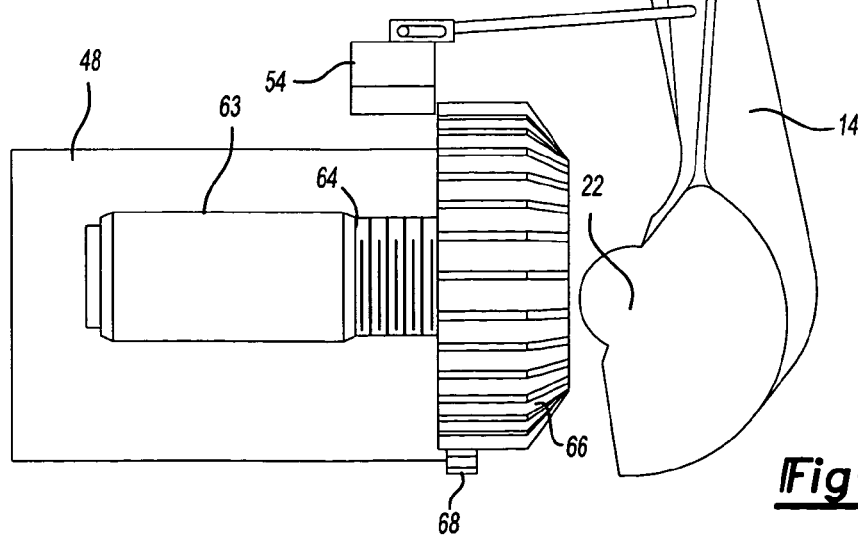
FIG. 8B is a side view of the slack adjustment system of FIG. 8A.

FIGS. 8A and 8B show the lever 14 when the brake is applied and the thrust assembly 26 has moved through the pre-defined slack. The latch 54 disengages with first gear 66. The gear 68 is free to rotate from the torque created by the biasing member 44. As gear 68 rotates this cause the first gear 66 to rotate, thus rotating the first screw 64. The first gear 66 is driven in the counter-clockwise direction 52, lengthening the thrust assembly 26 and reducing the slack. A similar rotation occurs on for the second screw 67 lengthening the second thrust assembly 28 (not shown).

Figure 9A:
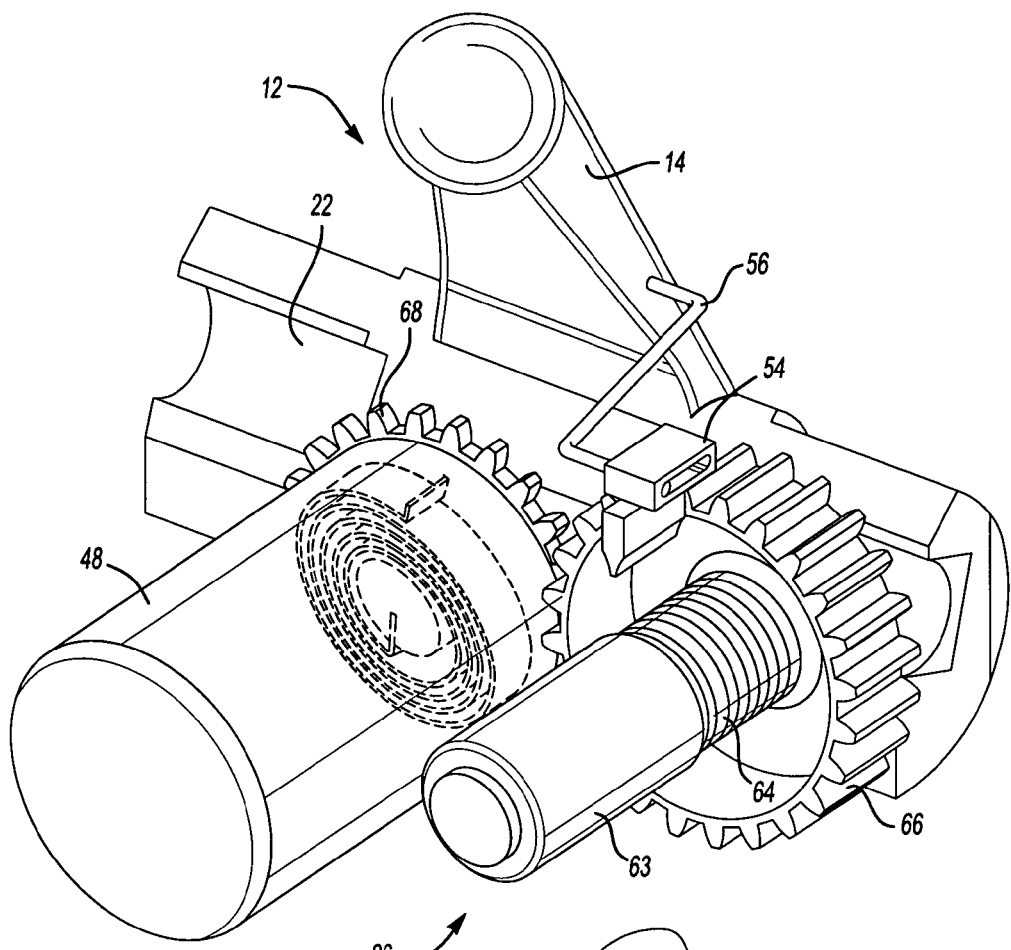
FIG. 9A is a perspective view of the slack adjustment system of the FIG. 7A embodiment of the present invention in a full braking position.
Figure 9B:
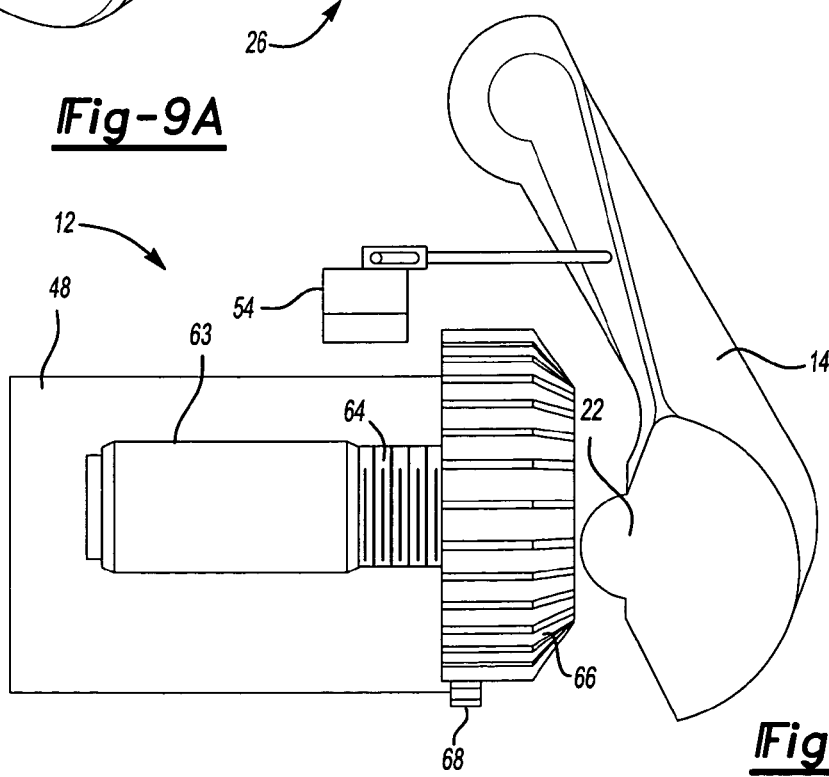
FIG. 9B is a side view of the slack adjustment system of FIG. 9A.

FIG. 9A and 9B show the lever 14, rotational member 48, latch 54, and the first gear 66 on the first screw 64 during a full brake position. The latch 54 has disengaged from the first gear 66. However, when the brake pad 30 and brake disc 29 are in contact load is applied through the first thrust assembly 26. The load prevents rotation of the first nut 63 and first screw 64 hence no adjustment occurs. Likewise the second thrust assembly is prevented from rotation. The preferred directions of rotation are shown in FIG. 6.

When the brake is released, if there is still excess slack when all load is released from the thrust assembly 26, the rotational member 48 and first screw 64 will be rotated further as shown in FIGS. 8A and 8B. The first screw 64 will continue to rotate until the travel of the thrust assembly 26 becomes equal to the predefined slack. The second screw 67 (not shown) will also rotate. At this point the latch 54 then re-engages with the first gear 66 preventing any further rotation.

Figure 10A:
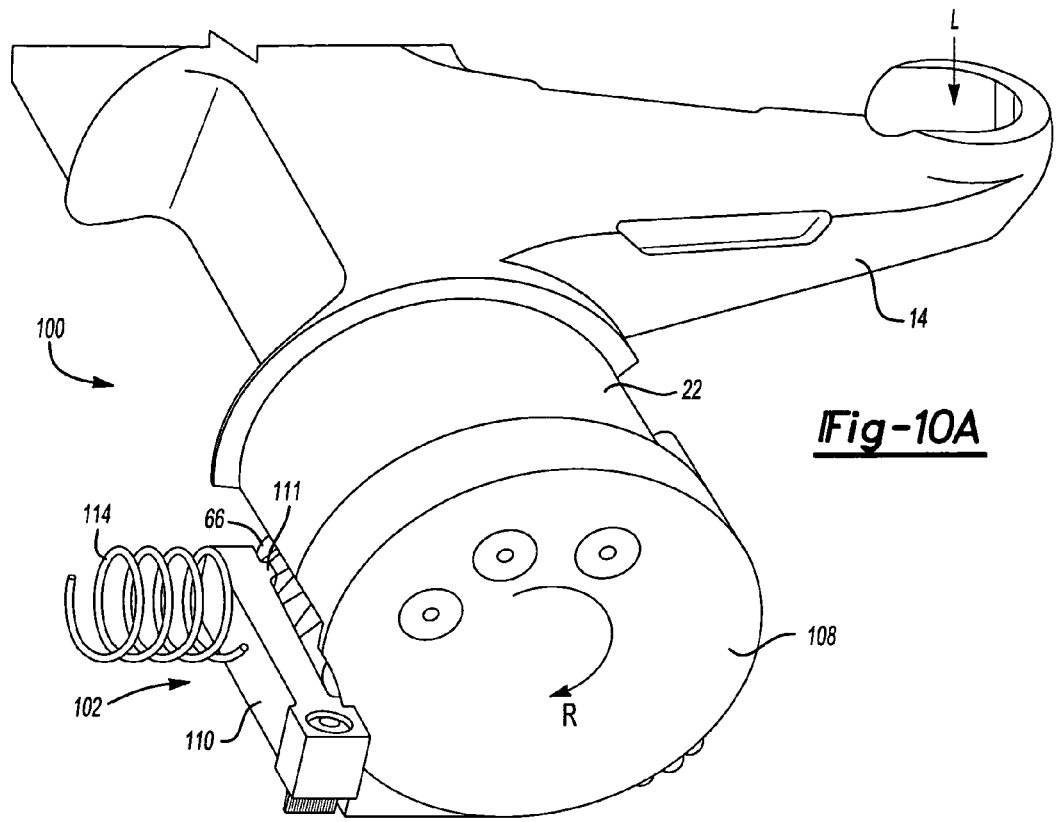
FIG. 10A shows another embodiment of the slack adjustment system where a locking mechanism is located adjacent a roller.
Figure 10B:
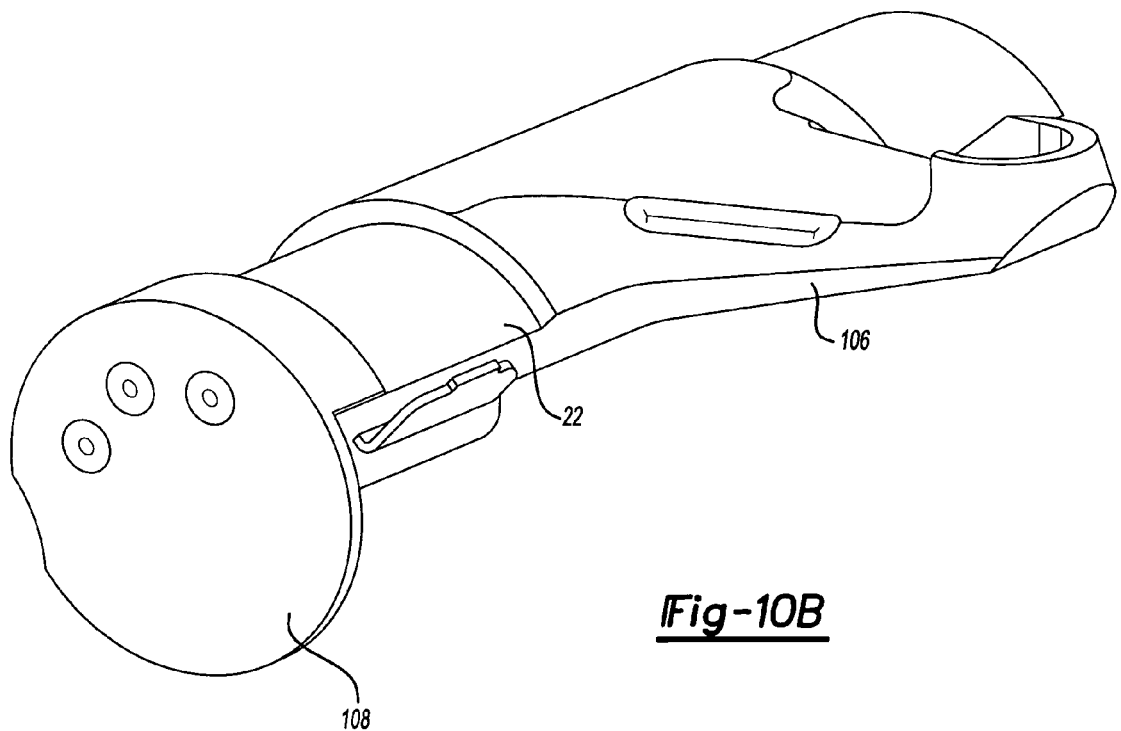
FIG. 10B shows the FIG. 10A embodiment of the slack adjustment system with a lever and roller having a cam mounted on the end of the roller.

FIG. 10A shows another embodiment slack adjustment system 100 where a locking mechanism 102 is located adjacent the roller 22. The roller 22 is recessed within the base of the lever 14. As a driver operates a brake (not shown) an input load (illustrated by arrow L) is transferred to a lever 14. Applying the input load L rotates the lever 14 causing the roller 22 to rotate (illustrated by arrow R). FIG. 10B shows the lever 14 and roller 22 with a cam 108 mounted on the end of the roller 22. The cam 108 rotates with the roller 22.

Figure 11:
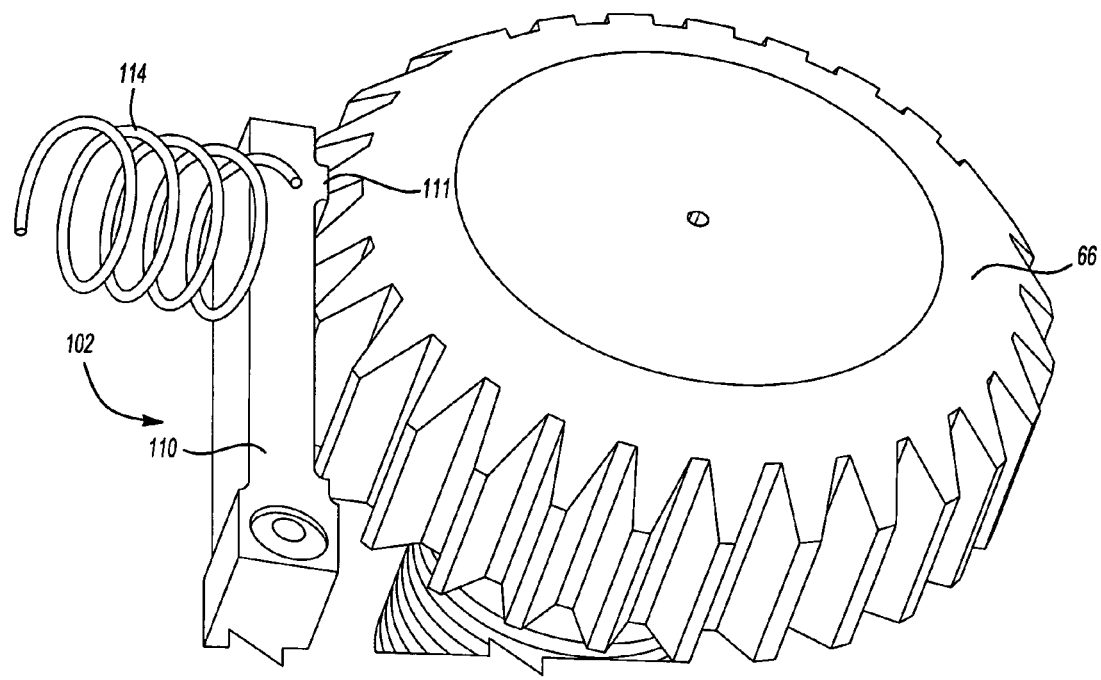
FIG. 11 shows an embodiment of the slack adjustment system where the locking mechanism has a latch.

Referring to FIG. 11, the locking mechanism 102 includes a latch 110 that engages the first gear 66. A spring 114 drives the latch 110 into the first gear 66 to maintain engagement between the first gear 66 and the latch 110.

Figure 12A:
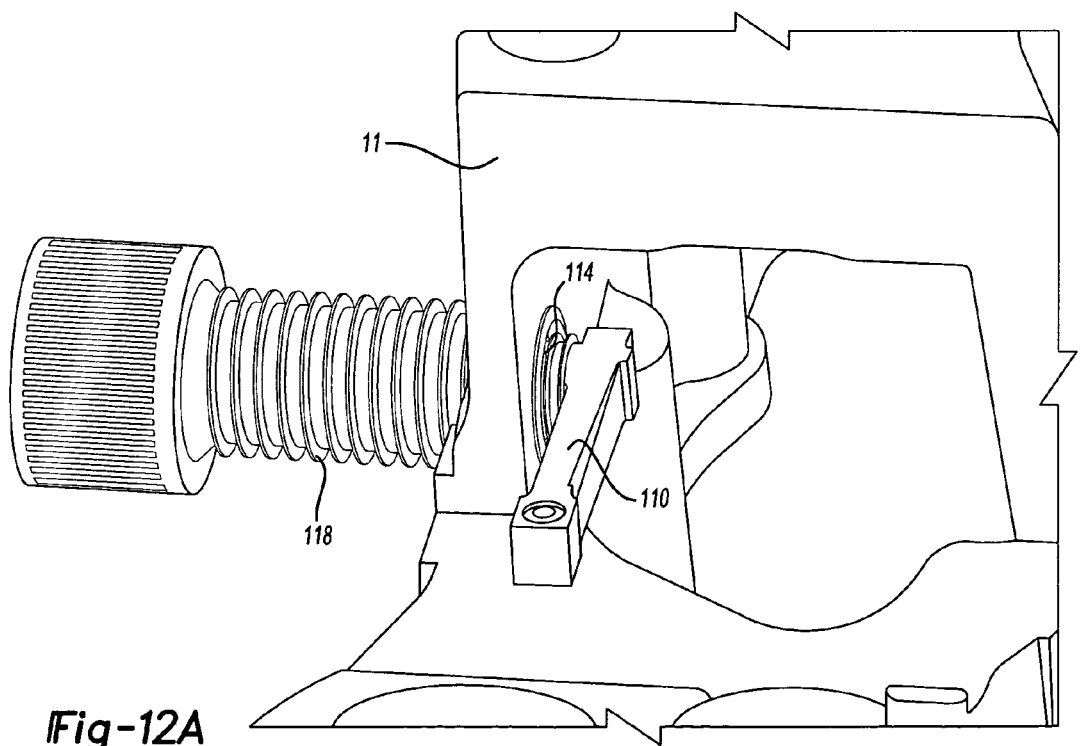
FIG. 12A shows a frame for the brake assembly with the latch and the spring.
Figure 12B:
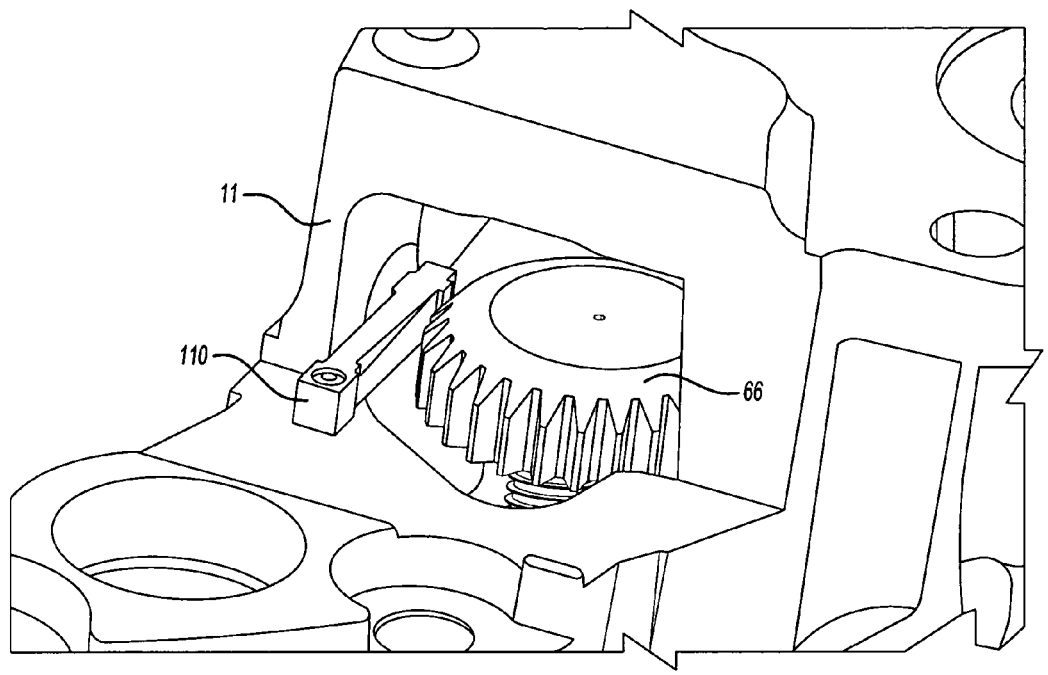
FIG. 12B shows a frame for the brake assembly with the latch and the first gear.
Figure 12C:
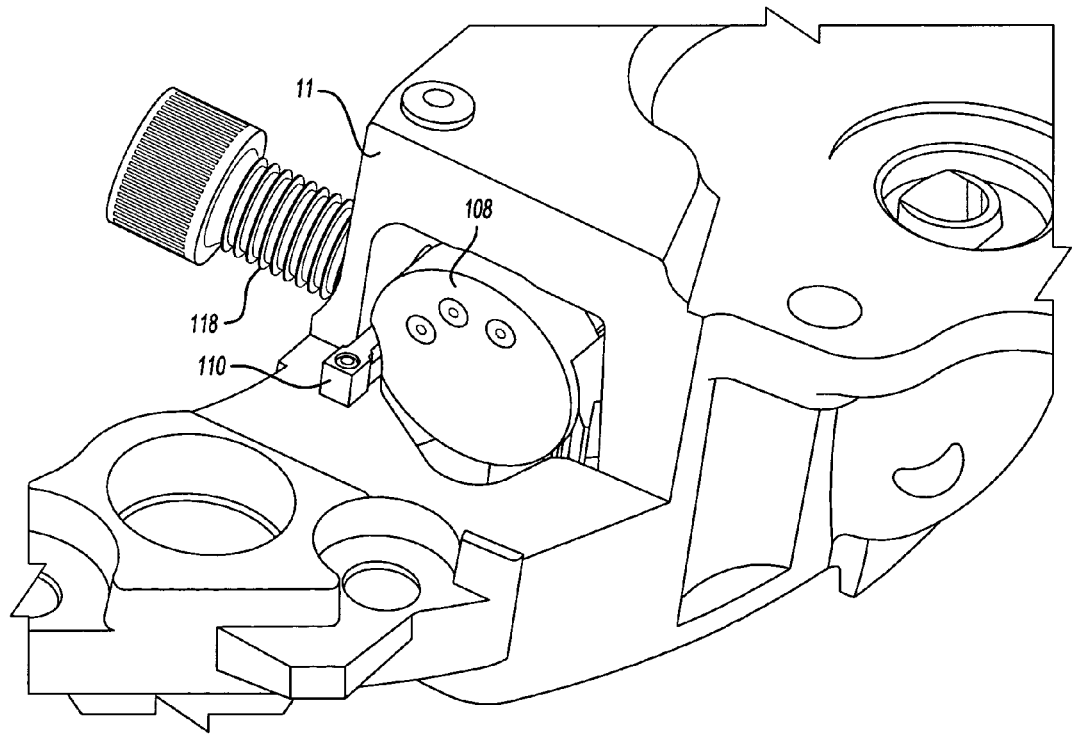
FIG. 12C shows a frame for the brake assembly with the latch and the screw within the frame.

FIG. 12A shows the latch 110 and the spring 114 within a frame 11 for the brake assembly 10. The spring 114 is within a screw 118 that is threaded into the frame 11. The screw 118 can be rotated to adjust the force the spring 114 applies to the latch 110. FIG. 12B shows the latch 110 within the frame 11 and contacting the first gear 66. The cam 108 and screw 118 are not shown so the engagement between the latch 110 and first gear 66 can be seen. FIG. 12C shows the locking mechanism 102 including the latch 110 and screw 118 within the frame 11 with the cam 108 and first gear 66.

Figure 13A:
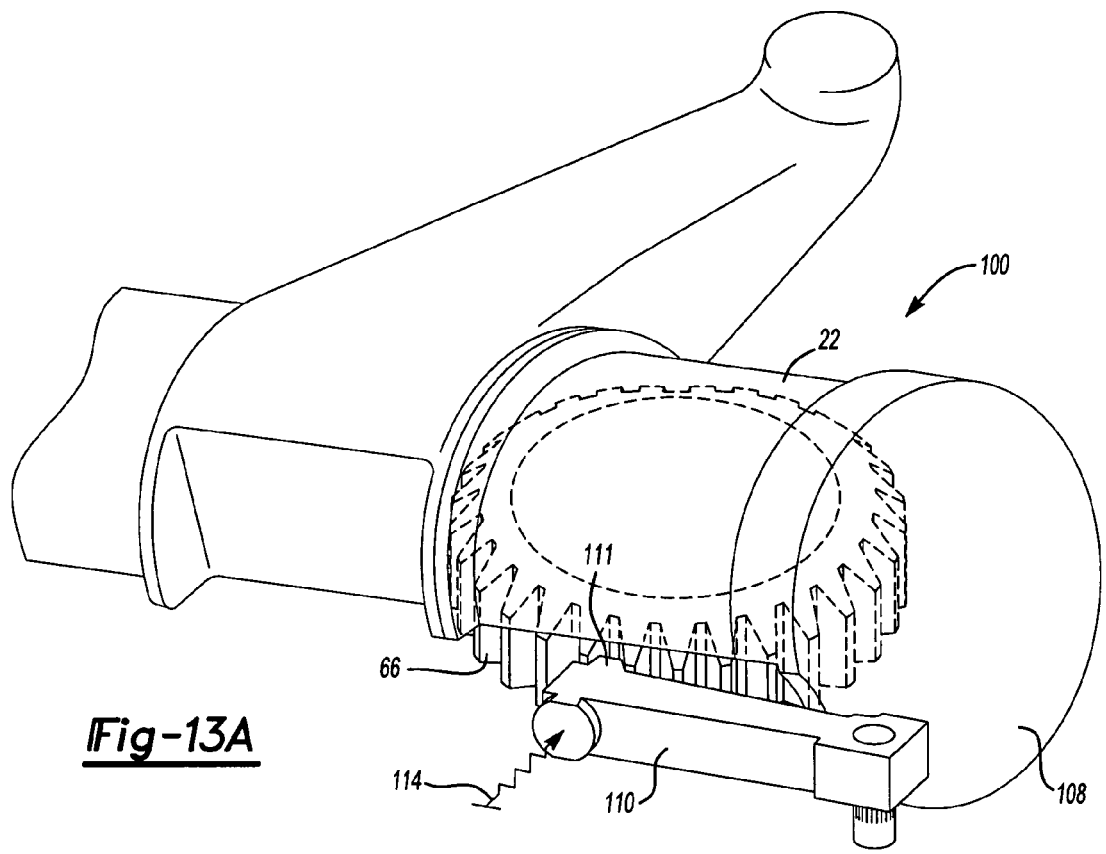
FIG. 13A shows the cam engaging the latch when no pressure is applied to the lever.
Figure 13B:
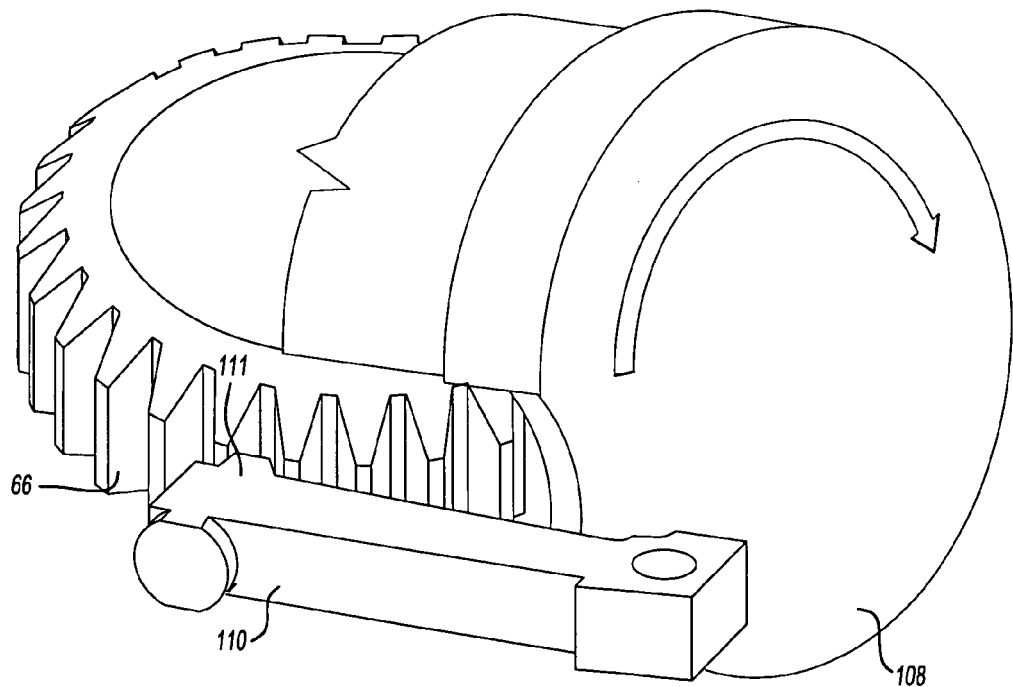
FIG. 13B shows the lever rotating the cam to drive the latch away from the first gear.
Figure 13C:
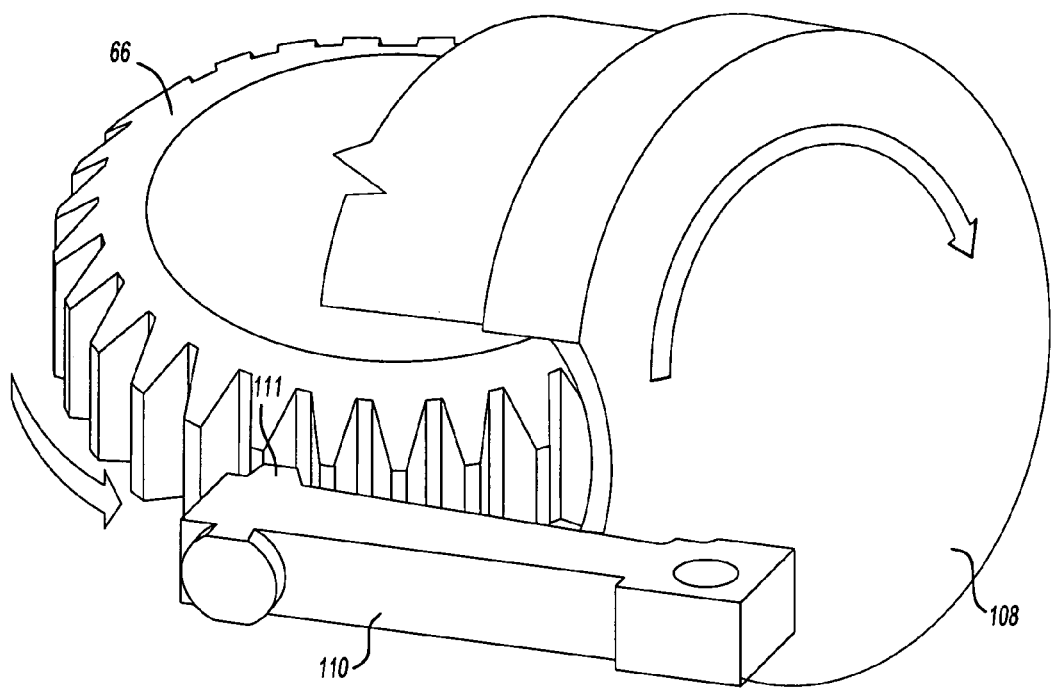
FIG. 13C shows the latch and cam when a sufficient amount slack is in the system to disengage the latch from the first gear.
Figure 14:
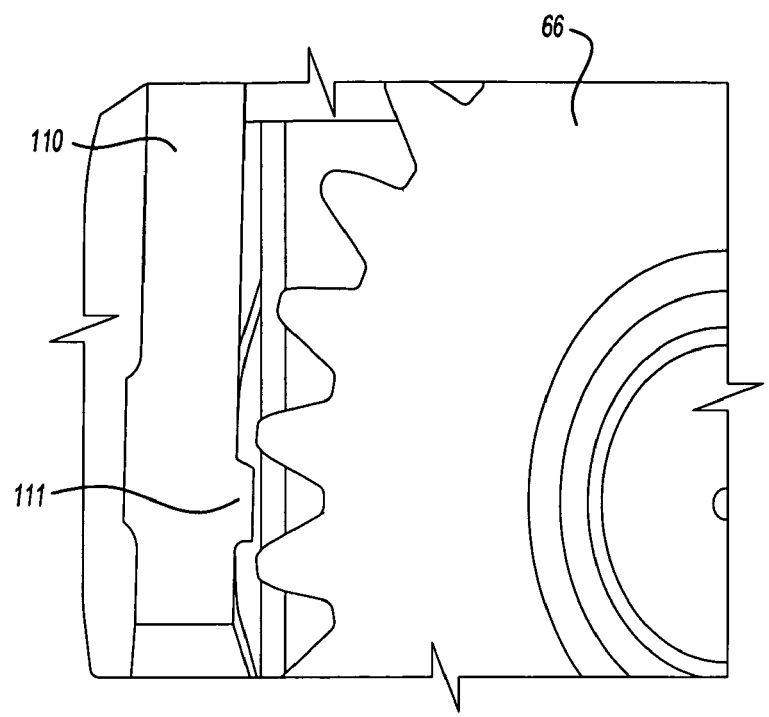
FIG. 14 shows the latch and gear when a sufficient amount slack is in the system to disengage the latch from the first gear.

FIG. 13A shows the cam 108 engaging the latch 110 when no pressure is applied to the lever 14. Rotating the lever 14 rotates the cam 108 driving the latch 110 away from the first gear 66 as shown in FIG. 13B. If there is only a minimal amount of slack in the brake system 10 then the roller 22 will not rotate far enough to disengage the latch 110 from the first gear 66. Tooth 111 on the latch 110 sits between teeth on the gear 66, preventing rotation, and hence preventing undesired adjustment. As the slack in the brake system increases the roller 22 must be rotated farther to engage the brakes. The farther the roller 22 rotates the more the cam 108 drives the latch 110 away from the first gear 66. FIG. 13C shows the latch 110 and cam 108 when undesirable slack is in the system and the roller 22 rotates a sufficient amount to disengage the latch 110 from the first gear 66. As shown a tooth 111 no longer engage between gear teeth on the gear 66, and no longer preventing the gear 66 from rotating. The position of the first gear 66 and latch 110 at this point are shown in FIG. 14. When the latch 110 is disengaged the first gear 66 can rotate freely to lengthen the thrust assemblies 26 and 28 adjusting the slack.

Figure 13D:
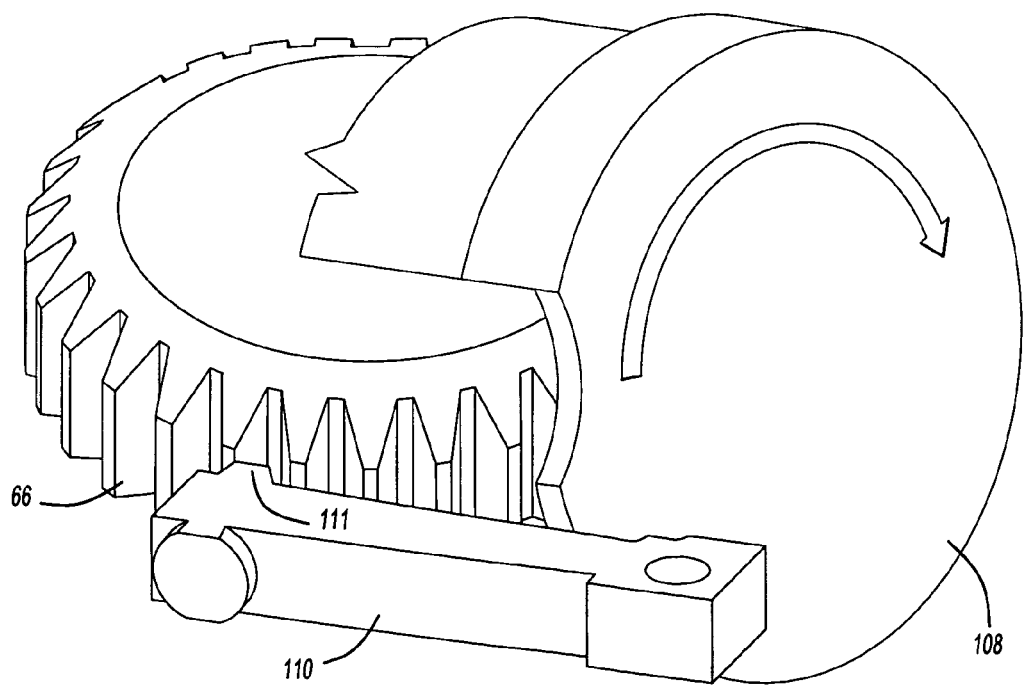
FIG. 13D shows the cam and latch when the roller is fully rotated.

FIG. 13D shows the cam 108 and latch 110 when the roller is fully rotated. The cam 108 is designed such that once the latch 110 has disengaged from the gear 66 the cam 108 will not move the latch 110 further away from the first gear 66. Thus, the amount of slack in the brake system 10 is controlled by the distance that the cam 108 pushes the latch 110 away from the first gear 66.

Figure 15:
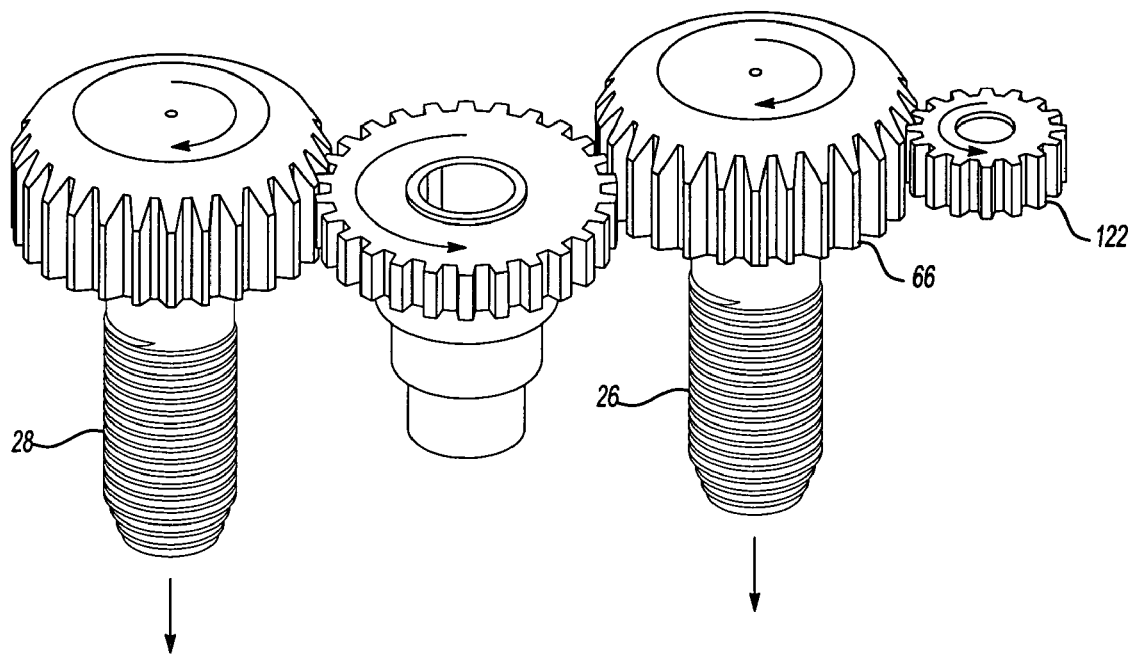
FIG. 15 shows a biasing member engaging the first gear.

A biasing member 120 (not shown) engages the first gear 66 through a gear 122 (shown in FIG. 15). The biasing member 120 is preferably an air motor but may take other forms such as a spring, electric motor, or the like. The biasing member 120 rotates the first gear 66 when the latch 110 is disengaged. Rotation of the first gear 66 causes the thrust assemblies 26 and 28 to lengthen and decreases the slack in the brake system 10. The force used to adjust the slack adjustment system is 100 is independent of the load L applied to the lever. The biasing member 120 provides the load used to rotate the first gear 66. By providing an independent source to bias the slack adjustment system 100 the load L applied to the lever is not used, increasing the efficiency of the slack adjustment system 100.

The foregoing description is only illustrative of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described.

For that reason the following claims should be studied to determine the true scope and content of this invention.

What is claimed is:

1. A slack adjustment system for a disc brake comprising:
   a lever mounted for rotation about a lever axis;
   a rotational member biased in a first direction about a biasing axis wherein said bias is independent of a force applied to said lever;
   a plurality of gears engaged with said rotational member for rotation in a second direction about a plurality of thrust axes parallel to said biasing axis; and
   a locking mechanism mounted adjacent said lever to selectively engage at least one of said plurality of gears to prevent rotation thereof, wherein said locking mechanism couples with teeth of said at least one of said plurality of gears.

2. The system as recited in claim 1, wherein said locking mechanism disengages said one of said plurality of gears in response to rotation of said lever about said lever axis.

3. The system as recited in claim 2, wherein said lever rotates through a predetermined amount before said locking mechanism is disengaged.

4. The system as recited in claim 1, wherein said locking mechanism is a wedge.

5. The system as recited in claim 4, wherein a spring biases said locking mechanism towards said one of said plurality of gears.

6. The system as recited in claim 4, wherein a cam on said lever disengages said locking mechanism from one of said plurality of gears.

7. The system as recited in claim 1, wherein said biasing member is an air motor.

8. The system as recited in claim 1, wherein said locking mechanism engages between said teeth to prevent rotation.

9. The system as recited in claim 1, wherein said locking mechanism is movable between a locked position wherein said at least one of said plurality of gears is prevented from rotating and an unlocked position where said at least one of said plurality of gears is rotatable to adjust a gap distance between a brake pad and a brake disc.

10. The system as recited in claim 9, wherein said rotational member includes a rotational gear rotatable about a gear axis, and wherein said plurality of gears includes a first gear in meshing engagement with one side of said rotational gear and a second gear in meshing engagement with an opposite side of said rotational gear, and wherein said locking mechanism directly engages teeth of one of said first and said second gears when in said locked position and wherein said locking mechanism moves out of engagement with said teeth of said one of said first and second gears when in said unlocked position.

11. A disc brake comprising:
    a lever receiving a brake input force and mounted for rotation about a lever axis;
    a slack adjustment system having a rotational member biased in a first direction about a biasing axis wherein the bias is independent of the brake input force applied to said lever;
    a plurality of gears engaged with said rotational member for rotation in a second direction about a plurality of thrust axes parallel to said biasing axis; and
    a locking mechanism mounted to selectively engage between teeth on at least one of said plurality of gears to prevent rotation thereof.

12. The disc brake recited in claim 11, wherein said locking mechanism disengages from said one of said plurality of gears in response to rotation of said lever about said lever axis.

13. The disc brake as recited in claim 11, wherein said lever rotates through a predetermined amount before said locking mechanism is disengaged.

14. The disc brake as recited in claim 11, including a disc rotatable about a brake axis and at least one friction element movable into engagement with said disc in response to said brake input force, and wherein said locking mechanism is movable between a locked position wherein said at least one of said plurality of gears is prevented from rotating and an unlocked position where said at least one of said plurality of gears is rotatable to adjust a gap distance between said at least one friction element and said disc.

15. The disc brake as recited in claim 14, wherein said rotational member includes a rotational gear rotatable about a gear axis, and wherein said plurality of gears includes a first gear in meshing engagement with one side of said rotational gear and a second gear in meshing engagement with an opposite side of said rotational gear, and wherein said locking mechanism directly engages teeth of one of said first and said second gears when in said locked position and wherein said locking mechanism moves out of engagement with said teeth of said one of said first and second gears when in said unlocked position.

16. A slack adjustment system for a disc brake comprising:
    a cam mounted on an end of a lever;
    a plurality of gears engaged with a rotational member for rotation about a plurality of thrust axes; and
    a locking mechanism mounted adjacent said cam to selectively engage between teeth on at least one of said plurality of gears to prevent rotation thereof.

17. The system as recited in claim 16, wherein said cam disengages said locking mechanism from one of said plurality of gears.

18. The system as recited in claim 16, wherein said locking mechanism is a wedge.

19. The system as recited in claim 16, wherein a spring biases said locking mechanism towards said one of said plurality of gears.

20. The system as recited in claim 16, wherein said rotational member includes a rotational gear rotatable about a gear axis, and wherein said plurality of gears includes a first gear in meshing engagement with one side of said rotational gear and a second gear in meshing engagement with an opposite side of said rotational gear, and wherein said locking mechanism directly engages teeth of one of said first and said second gears to prevent rotation thereof when said locking mechanism is in a non-adjustment position and wherein said locking mechanism is movable to an adjustment position where said locking mechanism moves out of engagement with said one of said first and second gears to allow a gap between a brake pad and a brake disc to be adjusted to a desired position.

* * * * *